(12) United States Patent
Wood

(10) Patent No.: US 7,775,031 B2
(45) Date of Patent: Aug. 17, 2010

(54) RECUPERATOR FOR AIRCRAFT TURBINE ENGINES

(76) Inventor: Ryan S. Wood, 14004 Quail Ridge Dr., Broomfield, CO (US) 80020

( * ) Notice: Subject to any disclaimer, the term of this patent is extended or adjusted under 35 U.S.C. 154(b) by 0 days.

(21) Appl. No.: 12/116,536

(22) Filed: May 7, 2008

(65) Prior Publication Data
US 2009/0277154 A1 Nov. 12, 2009

(51) Int. Cl.
F02C 7/10 (2006.01)
(52) U.S. Cl. .................. 60/39.511; 165/4
(58) Field of Classification Search ........ 60/39.511; 165/4, 179, 182, 183
See application file for complete search history.

(56) References Cited

U.S. PATENT DOCUMENTS

| | | | |
|---|---|---|---|
| 3,185,210 A * | 5/1965 | Kuhne et al. | 165/134.1 |
| 3,201,938 A * | 8/1965 | Zirin | 60/39.511 |
| 3,222,864 A * | 12/1965 | Dyste et al. | 60/39.511 |
| 3,782,457 A * | 1/1974 | Troy | 165/165 |
| 3,818,696 A | 6/1974 | Beaufrere | |
| 3,939,904 A | 2/1976 | Beaufrere | |
| 4,122,668 A | 10/1978 | Chou et al. | |
| 4,307,568 A | 12/1981 | Huller et al. | |
| 4,506,502 A | 3/1985 | Shapiro | |
| 4,844,151 A | 7/1989 | Cohen | |
| 4,928,755 A | 5/1990 | Doty et al. | |
| 4,967,633 A * | 11/1990 | Jewell, Jr. | 84/404 |
| 4,993,223 A | 2/1991 | Kretzinger | |
| 5,267,605 A | 12/1993 | Doty et al. | |
| 5,323,849 A * | 6/1994 | Korczynski et al. | 165/158 |
| 5,329,758 A | 7/1994 | Urbach et al. | |
| 5,473,899 A | 12/1995 | Viteri | |
| 5,581,997 A | 12/1996 | Janes | |
| 5,666,819 A | 9/1997 | Rockenfeller et al. | |
| 5,797,449 A * | 8/1998 | Oswald et al. | 165/165 |
| 5,944,090 A * | 8/1999 | Teal | 165/47 |
| 5,966,334 A * | 10/1999 | Shore | 365/200 |
| 6,031,856 A | 2/2000 | Wu et al. | |
| 6,092,361 A | 7/2000 | Romani | |
| 6,293,086 B1 | 9/2001 | Reynolds | |
| 6,307,278 B1 * | 10/2001 | Nims et al. | 290/52 |
| 6,363,706 B1 | 4/2002 | Meister et al. | |
| 6,585,034 B2 | 7/2003 | Oswald | |
| 6,629,413 B1 | 10/2003 | Wendt et al. | |
| 6,676,305 B2 | 1/2004 | Dallas et al. | |

(Continued)

FOREIGN PATENT DOCUMENTS

WO   WO 2009/089460   7/2009

OTHER PUBLICATIONS

Direct Energy Professional Society, Solid State and Diode Laser Technology Review, Jun. 13-15, 2006.

Primary Examiner—Michael Cuff
Assistant Examiner—Phutthiwat Wongwian
(74) Attorney, Agent, or Firm—Marsh Fischmann & Breyfogle LLP

(57) ABSTRACT

A recuperator for use in transferring heat from gas turbine exhaust gases to compressed air inlet gases before combustion. The recuperator utilizes a plurality (e.g., thousands) of microtubes or microchannels to form a heat exchanger having high effectiveness and low pressure drop while maintaining a low weight. Accordingly, the recuperator presented herein may be incorporated into light aircraft and helicopters without significantly compromising the performance thereof.

16 Claims, 10 Drawing Sheets

U.S. PATENT DOCUMENTS

| | | | |
|---|---|---|---|
| 6,742,576 B2 * | 6/2004 | Bergevin | 165/133 |
| 6,901,759 B2 | 6/2005 | Frutschi | |
| 6,966,173 B2 * | 11/2005 | Dewis | 60/39.511 |
| 6,988,315 B2 | 1/2006 | Parish, IV et al. | |
| 7,220,365 B2 | 5/2007 | Qu et al. | |
| 7,240,723 B2 * | 7/2007 | Wu et al. | 165/158 |
| 7,251,926 B2 | 8/2007 | Shibata et al. | |
| 7,267,160 B2 * | 9/2007 | Shincho et al. | 165/83 |
| 7,334,411 B2 * | 2/2008 | Vandermolen | 60/772 |
| 2003/0037547 A1 | 2/2003 | Bakran et al. | |
| 2004/0020206 A1 | 2/2004 | Sullivan et al. | |
| 2005/0144931 A1 * | 7/2005 | Floyd et al. | 60/39.511 |
| 2008/0006040 A1 | 1/2008 | Peterson et al. | |

* cited by examiner

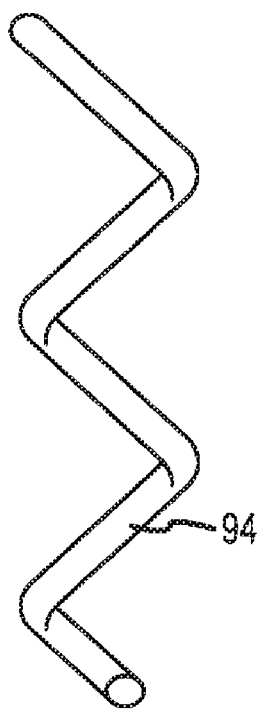
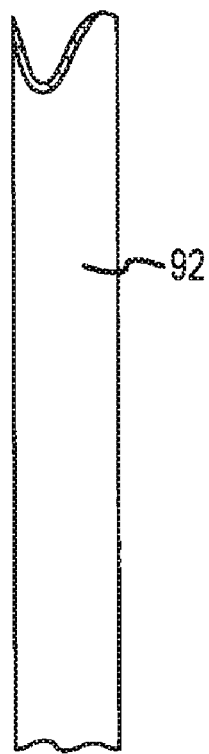
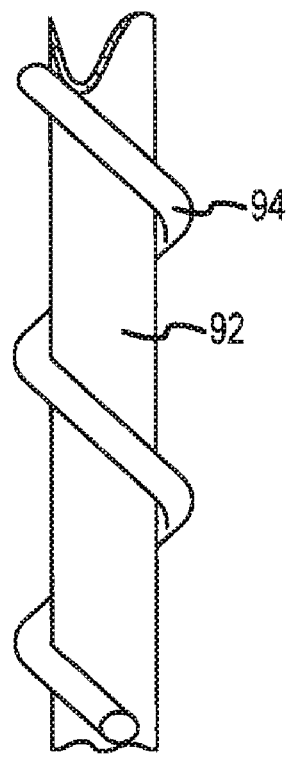
FIG.12A  FIG.12B

RECUPERATOR FOR AIRCRAFT TURBINE ENGINES

FIELD

The present disclosure is directed toward recuperators for use with turbine engines. More specifically, the present disclosure is directed toward a lightweight recuperator that has particular applicability for use with gas turbine engines of light aircraft and helicopters.

BACKGROUND

A gas turbine engine extracts energy from a flow of hot gas produced by combustion of gas or fuel oil in a stream of compressed air. In its simplest form, a gas turbine engine has an air compressor (radial or axial flow) fluidly coupled to a turbine with a combustion chamber disposed therebetween. Energy is released and work is performed when compressed air is mixed with fuel and ignited in the combustor, directed over the turbine's blades, spinning the turbine. Energy is extracted in the form of shaft power (e.g., turboshaft engines) and/or compressed air and thrust (e.g., turbojet/turbofan engines).

Irrespective of the exact engine type, most gas turbine engines operate in a similar manner. Initially, ambient air is received at the inlet of the compressor where it is compressed and discharged at a substantially higher pressure and temperature. The compressed air then passes through the combustion chamber, where it is mixed with fuel and burned thereby further increasing the temperature and, by confining the volume, the resultant pressure for combustion gases. The hot combustion gases are then passed through the hot turbine section where mechanical shaft power may be extracted to drive a shaft, propeller or fan. Any remaining exhaust gas pressure above ambient pressure can be used to provide thrust if exhausted in rearward direction.

Some turbine engines also try to recover heat from the exhaust, which otherwise is wasted energy. For instance, a recuperator is often used in association with the combustion portion of a gas turbine engine, to increase its overall efficiency. Specifically, the recuperator is a heat exchanger that transfers some of the waste heat in the exhaust to the compressed air, thus preheating it before entering the fuel combustor stage. Since the compressed air has been preheated, less fuel is needed to heat the compressed air/fuel mixture up to the turbine inlet temperature. By recovering some of the energy usually lost as waste heat, the recuperator can make a gas turbine significantly more efficient.

Use of a recuperator, while improving efficiency of a gas turbine engine, can also have a number of disadvantages in various applications. One such potential disadvantage is the reduction of power of a turbine engine that includes a recuperator. As may be appreciated, passing compressed air from the compressor through plumbing associated with a recuperator/heat exchanger results in a pressure drop of the compressed air thereby reducing the high-end performance (e.g., maximum power) of the engine. Such reduced power output is especially disadvantageous in aircraft and helicopter applications where maximum power is often desired and/or necessary during takeoff or hot and high altitude flying.

Another potential disadvantage is the increased weight of a turbine engine incorporating a recuperator. Such a disadvantage is also evident in aircraft applications where turbine engines are often utilized due to their high power to weight ratio. That is, in most cases, gas turbine engines are considerably smaller and lighter than reciprocating engines of the same power rating. For this reason, turboshaft engines are used to power almost all modern helicopters. Typically, incorporation of a recuperator has heretofore resulted in significant addition of weight to the turbine engine. Historically, the added weight and cost of the recuperator and associated system plumbing has more than offset any reduced fuel consumption, yielding endurance break-even times that are much too long for typical flight times.

For at least these reasons, use of recuperators have not found widespread acceptance in the light aircraft and helicopter industry.

SUMMARY

Presented herein is a recuperator that may be utilized with turbine engines of light aircraft, such as a helicopter While providing improved fuel consumption and increased endurance of such aircraft with minimal losses in the overall power. A portion of the invention relies on the recognition by the inventor that use of microtubes or a microchannel heat exchanger in a recuperator allows for producing a recuperator having an overall mass that is low enough, with heat exchanger effectiveness and resulting fuel savings to overcome the drawbacks of previous recuperators while also providing a recuperator having low pressure and power loss.

In one aspect, a recuperator is provided for use with a gas turbine engine having an external duct between a compressor discharge air outlet and a combustor inlet. The recuperator includes a housing, a heat exchanger core, an inlet header and an outlet header. The inlet header includes an inlet port that is connectable to the outlet of a compressor of the turbine engine. The outlet header includes an outlet port that is connectable to an external combustor inlet of the engine. A plurality of microtubes or microchannels defining the core extend between and fluidly interconnect the inlet and outlet headers. The housing at least partially surrounds the microtubes/microchannels and includes an exhaust inlet port and exhaust outlet port for connection with exhaust ducting of the engine. In this regard, when the housing is interconnected to the exhaust ducting, exhaust gases are directed over, through and around the microtubes that extend between the headers.

In one arrangement, the plurality of microtubes/microchannels may be disposed transverse to the exhaust gas flow. In such an arrangement, the recuperator may be a cross-flow recuperator. In another arrangement, the microtubes/microchannels may be substantially aligned with the axis of flow of the exhaust gases through the recuperator. In such an arrangement, the recuperator may be a counter-flow recuperator.

In order to allow for adequate mass flow through the microtubes/microchannels as well as adequate heat transfer between the outside surfaces of the microtubes and the exhaust gases, the recuperator will typically incorporate over ten thousand microtubes or microchannels. In an arrangement where round microtubes are utilized, the microtubes will have maximum inside diameter of less than about 2 mm and more preferably less than about 1 mm. However, it will be appreciated that the microtubes/microchannels need not be round in cross-section. That is, the microtubes may be ovular, square, hexagonal or any other closed geometric (i.e., tubular) shape with appendages both internal to the tube/channel or external creating different heat exchanger performance based on the geometry. Further, in any microtube/microchannel arrangement it is desirable to reduce the wall thickness of each channel in order to reduce the overall weight of the recuperator. In this regard, it is preferable that the microtubes have a wall thickness of no more than 260 micrometers and more preferably less than about 100 micrometers.

In one arrangement, the microtubes or channels are disposed in an annular arrangement to allow exhaust gases to pass through the annulus formed by the channels. In such an arrangement, a baffle or deflector may be disposed within the annulus or at the end of the recuperator exhaust in order to deflect exhaust gases over, through and around the microtubes. Further, in such an arrangement, the inlet and outlet headers may be annular structures.

In order to reduce the pressure drop across the recuperator, it may be desirable that the inlets of each of the microtubes and/or outlets thereof be rounded in order to improve flow of compressed air into each of the microtubes. Further, it may be desirable to provide a surface imperfection on the inside diameter of each microtube in order to create turbulent flow. For instance, dimples disposed along the length of each microtube may be utilized in order to improve turbulent flow through the microtube. Likewise, a twisting/candy-striping process may be utilized with each microtube/microchannel in order to improve turbulent flow. Another approach is to insert a spiral metal spring within each microtube and/or on the outside of each microtube all with the objective to improve heat transfer by increasing the turbulence of the working fluids. Adhering the metal spring can be accomplished in a variety of ways, from welding, to mechanical attachment to the use of extreme cold and or heat to shrink and/or expand the metal insert or microtube. In another arrangement, a spirally twisted metal tape is inserted into some or all of the microtubes. Such a spiral tape may include holes or cut outs to minimize pressure drop while maintaining turbulent mixing of the fluid to improve heat transfer.

The recuperator may be manufactured in many different ways. One approach is the use of small round microtubes or channels that are described herein assembled and welded or bonded into the headers of the heat exchanger. Another approach is metal foil lamination where the microtubes or channels are created by stacking thin metal etched foils on top of each other to build a complete recuperator. The foils are diffusion bonded to create a complete recuperator heat exchanger core structure.

In another aspect, the recuperator may be utilized with a manifold system in order to selectively bypass the recuperator when engine experiences high power requirement. In such an arrangement, a bypass duct may extend between a compressor outlet duct that is interconnected to the inlet header and combustor inlet duct that is interconnected to the outlet header. A valve may be disposed proximate to the junction of the bypass duct with the compressor outlet duct. Accordingly, such a valve may be controlled to selectively switch compressed air flow through the recuperator or the bypass duct. In another arrangement, a bypass duct and valve system may be utilized with the exhaust ducting as well. In one arrangement, the valve that is utilized to switch between the recuperator and the bypass duct may be an automated electric valve that is operative to manually or automatically switch the valve based on engine operating conditions. For instance, during high load applications, the valve may direct fluid flow through the bypass duct(s).

In one arrangement, the pressure drop of compressed air between the inlet header and the outlet header is less than about 3%. In a further arrangement, the pressure drop between the headers is less than about 1.5%. In any such arrangement, it may be preferable that the recuperator have an effectiveness of at least 0.6. It may be more preferable that the recuperator have an effectiveness of at least 0.8.

In another aspect, a recuperator is provided for use with a turbine engine. Such a recuperator includes an annular inlet header having an inner volume connectable to a compressor outlet of the turbine engine and an annular outlet header having an inner volume connectable to a combustor inlet of the turbine engine. The recuperator includes a plurality of microtubes extending between and fluidly interconnecting the inner volumes of the annular inlet and outlet headers. A housing extends between the annular inlet header and the annular outlet header and surrounds the microtube. The annulus defined by the inlet and outlet headers defines an exhaust port through the recuperator. Accordingly, exhaust gases may be directed through the recuperator between the headers and further directed over the microtubes.

In another aspect, a method is provided for retrofitting a recuperator onto a gas turbine engine including an external compressor outlet duct extending between a compressor and a combustor inlet. The method includes providing a cross or counter-flow recuperator having an inlet header and an outlet header and a plurality of microtubes extending between the headers. The recuperator further includes an exhaust inlet port and an exhaust outlet port. The method further includes replacing the external duct extending between the compressor outlet and the combustor inlet with a first duct extending between the compressor outlet and the inlet header of the recuperator. A second duct is extended between the outlet header and the combustor inlet. Furthermore, the recuperator is disposed into an exhaust path of the engine such that exhaust gases enter into the exhaust inlet port of the recuperator and exit from the exhaust outlet port of the recuperator. The method may further include providing bypass ducts for the compressed gas inlet and/or exhaust gases.

In one particular arrangement, a recuperator of the above noted aspects may be utilized with a gas turbine engine of the Rolls-Royce Model 250 family of turbine engines.

BRIEF DESCRIPTION OF THE DRAWINGS

FIGS. 12A and 12B illustrate application of a coil to a microtube.

DETAILED DESCRIPTION

Reference will now be made to the accompanying drawings, which assist in illustrating the various pertinent features of the various novel aspects of the present disclosure. Although the invention is described primarily with respect to a recuperator embodiment for use with a specific turbine engine family, the invention is applicable to a broad range of turbine engines outside of this engine family. In this regard, the following description is presented for purposes of illustration and description. Furthermore, the description is not intended to limit the invention to the form disclosed herein. Consequently, variations and modifications commensurate with the following teachings, and skill and knowledge of the relevant art, are within the scope of the present invention.

As noted, the recuperator discussed herein may be utilized with a variety of different gas turbine engines, however, it is especially well suited for use in the Rolls-Royce Model 250 family of engines (US military designation T63). This family of engines has a number of different sizes and varying configurations. The engine was originally designed by a General Motors offshoot, the Allison Engine Company, in the early 60's. A program of continuous development has resulted in a range of engine models that power many of the world's most popular small aircraft and helicopters. For instance, a small non-inclusive list includes the Bell 206B/TH-67, MDH MD500/520N and Eurocopter AS.355/BO 105. As a result, nearly 30,000 Model 250 engines have been produced. Of these, approximately 17,000 remain in active service.

Figure 1:
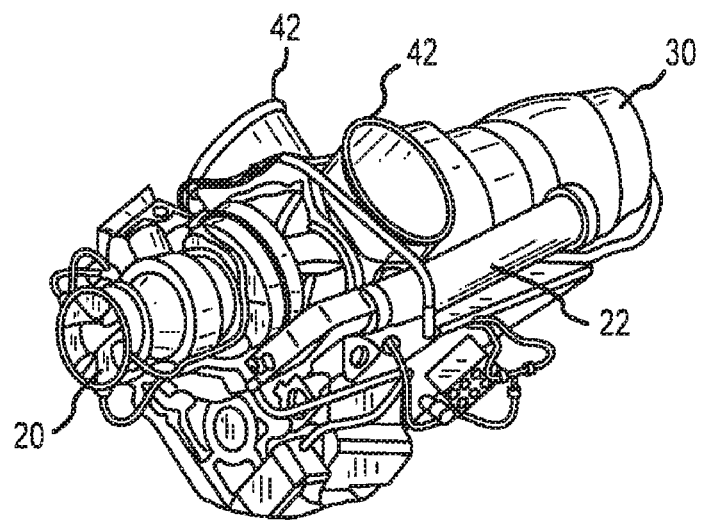
FIG. 1 illustrates a perspective view of a gas turbine engine.
Figure 2:
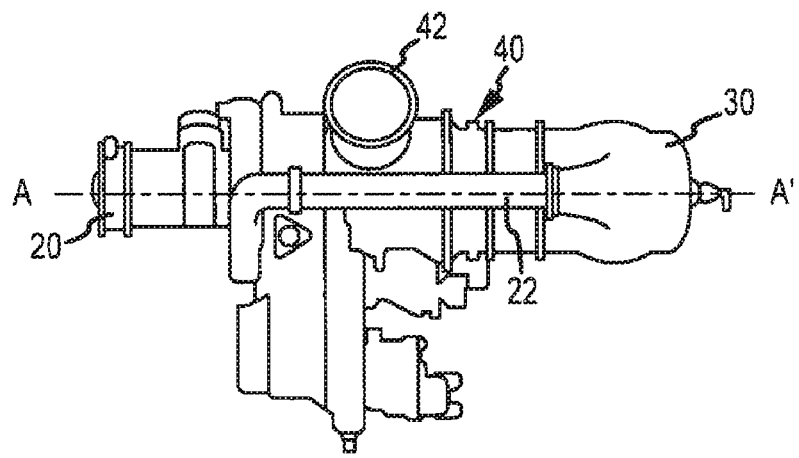
FIG. 2 shows a side view of the engine of FIG. 1.
Figure 3:
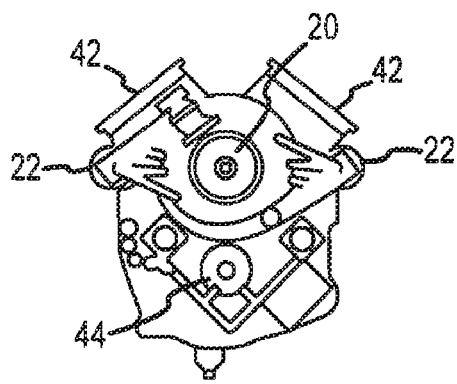
FIG. 3 shows an end view of the engine of FIG. 1.

The Model 250 engine 10, as schematically shown in the perspective, side and front views of FIGS. 1-3, utilize what is sometimes referred to as a "trombone" engine configuration where air enters the intake of the compressor 20 in a conventional fashion but compressed air leaving the compressor 20 is ducted rearwards around the turbine system via external air ducts 22. That is, unlike most other turboshaft engines, the compressor 20, combustor 30 and turbine stage 40 are not provided in an inline configuration, with the compressor at the front and the turbine at the rear where compressed air flows axially through the engine. Rather, in the Model 250 engines, the engine air from the forward compressor 20 is channeled through the external compressed air ducts 22 on each side of the engine 10 to the combustor 30 located at the rear of the engine. The exhaust gases from the combustor 30 then pass into a turbine stage 40 located intermediate the combustor 30 and the compressor 20. The exhaust gases are exhausted mid-engine in a radial direction from the turbine axis A-A of the engine, through two exhaust ducts 42. A power take-off shaft 44 connects the power turbine of the turbine stage to a compact reduction gearbox (not shown) located inboard between the compressor and the exhaust/power turbine system.

Figure 4:
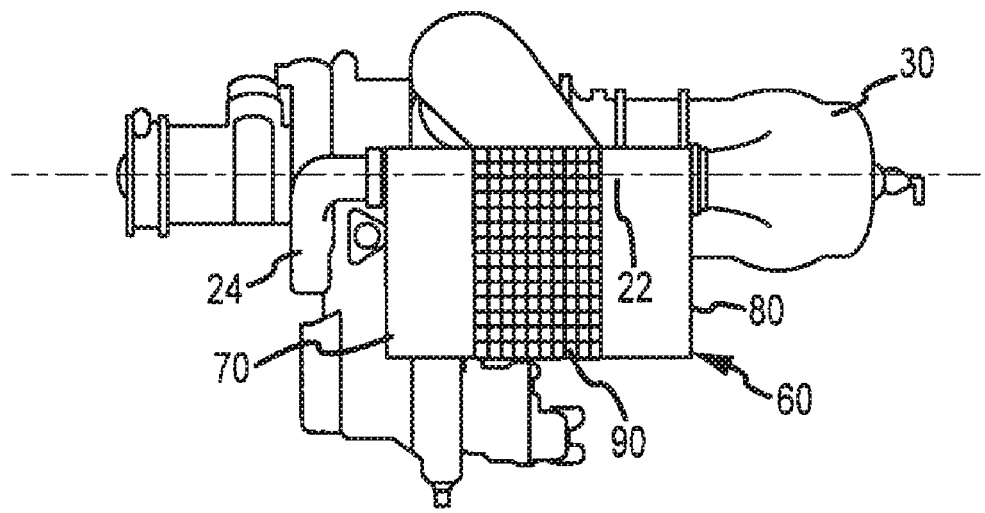
FIG. 4 shows a side view of the engine of FIG. 1 with a recuperator.
Figure 5:
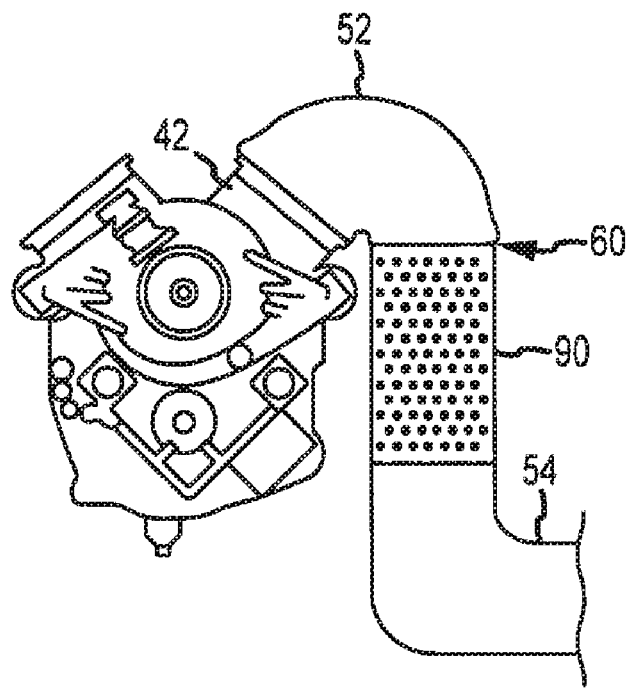
FIG. 5 shows an end view of the engine of FIG. 1 with a recuperator.
Figure 6:
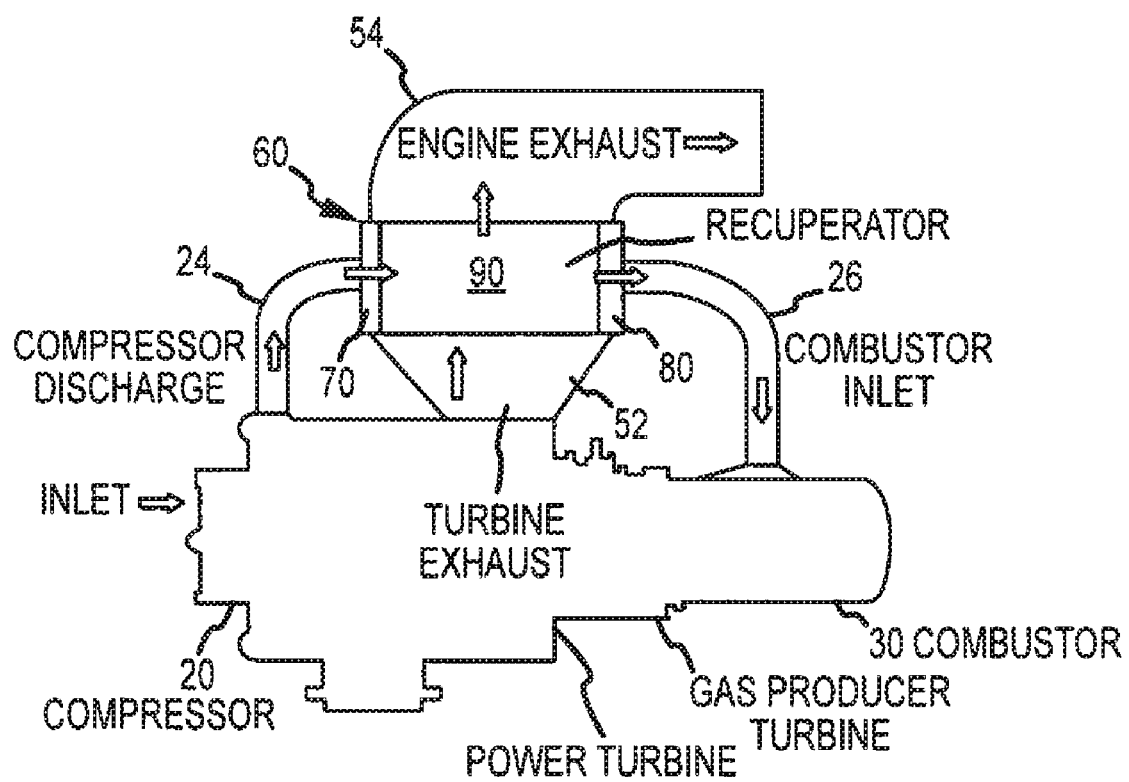
FIG. 6 shows a top view of the engine of FIG. 1 with a recuperator.

As shown in FIGS. 4-6, the compressed air ducts 22 can be readily tapped, replaced and/or rerouted through a recuperator 60 that is incorporated into ducting 52, 54 connected to the exhaust duct 42 and leading to an exhaust outlet (not shown). Once rerouted, air is drawn into the compressor 20, where it is compressed and then discharged through a pair (only one shown) of compressor outlet ducts 24 extending between the compressor outlets and the inlets of a pair of recuperator inlet headers 70 on either side of the compressor 20. The inlet header feeds the compressed air into and through the core 90 of the recuperator 60 where the compressed air is heated by the exhaust gases. The heated compressed air then passes from the recuperator core 90 into an outlet header 80 and then into the combustor 30. In some embodiments, manifolds or ducts 26 may extend between the outlet of the outlet header 80 and the inlet of the combustor 30. In any case, the hot combustion gases from the combustor 30 are then passed to the turbine stages. It is thus clearly seen that the Model 250 engine can be readily modified by replacing the external compressor air discharge ducts 20 with appropriate manifold/ducting without unduly changing the air flow path of the system.

While this family of turbine engines, as well as other turbine engines, may be retrofit to utilize a recuperator, use of recuperators has not found widespread acceptance in the aircraft industry. One of the main reasons for the reluctance to utilize such recuperators is the increase in the weight of the engine system that is realized through the incorporation of the recuperator. For instance, while a recuperator may reduce fuel consumption of an aircraft by raising the thermal efficiency of the engine, for example, from around 20% to around 30%, such fuel savings often do not offset the added weight incurred by incorporating a recuperator into the system. That is, if fuel weighs 6 pounds per gallon and a recuperator system increased the weight of the engine by 140 pounds, the fuel savings would have to be over 23 gallons in order to offset the added weight of the recuperator system without reducing the range of the aircraft in which the engine and recuperator is utilized. In this regard, the trade-off in fuel savings has not been great enough to offset the compromise to the performance of aircraft. This is due in part to the previous construction of most recuperators that utilize a plate-fin heat exchanger arrangement. Typically, such plate-fin arrangements results in recuperators of considerable mass and volume. Additionally, such plate-fin heat exchangers/recuperators have also resulted in considerable pressure drop of the compressed fluid moving across the recuperators. In this regard, previous recuperators have resulted in significant pressure drops, which significantly reduce the maximum power of a turbine engine. As will be appreciated, during aircraft operations, and especially take-off operations, aircraft often require maximum power. By incorporating a recuperator that significantly reduces the maximum power by imposing significant pressure drops, previous recuperators have provided an additional reason for limiting their use in light aircraft operations.

Figure 7:
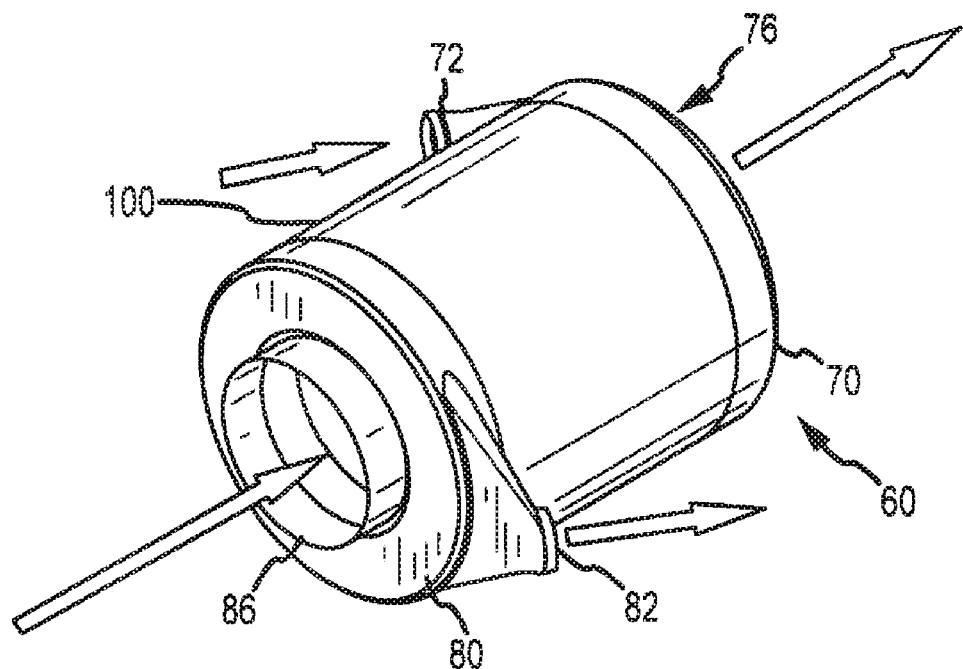
FIG. 7 shows a perspective view of one embodiment of a microtube recuperator.
Figure 8:
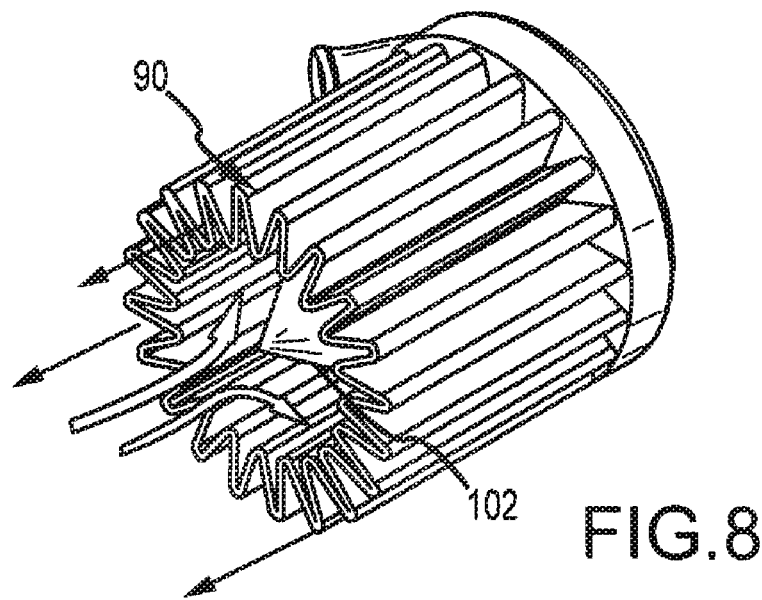
FIG. 8 shows internal components of the recuperator of FIG. 7.
Figure 9:
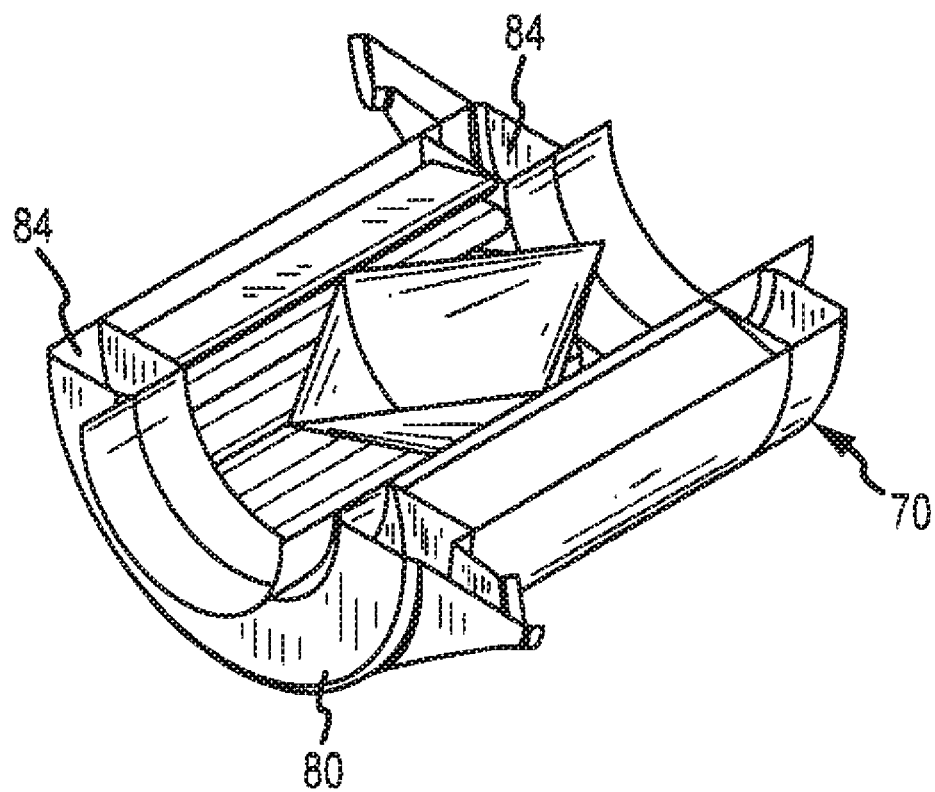
FIG. 9 shows a cross-sectional view of the recuperator of FIG. 7.

The recuperator of the present invention overcomes these difficulties by utilizing a novel light-weight approach that provides high efficiency heat transfer between compressed gases and exhaust gases with minimal pressure drop. The recuperator of the present invention may, in some embodiments, be installed with Model 250 engines where the installed system weighs less than about 50 lbs.; the weight includes necessary ducting. FIGS. 7, 8 and 9 illustrate a recuperator 60 in accordance with various aspects of the present invention. Other larger engines of the Rolls-Royce family with larger mass flow rates may weight more than 50 pounds, in general the weight is proportional to mass flow if other variables such as pressure loss and effectiveness are held constant. While illustrated as an annular counter flow recuperator, it will be appreciated that the invention is not limited to such a configuration. As shown in FIG. 7, the recuperator 60 is formed from an annular inlet header 70, an annular outlet header 80 and a housing 100 that extends between the inlet header 70 and the outlet header 80. As utilized herein, the term annular is meant to define a structure that defines a closed geometric shape having an internal aperture/annulus. However, such a structure is not to be limited to a circular closed geometric shape. Rather, the term annular is utilized to indicate any closed geometric shape (e.g., square, triangular, rectangular, irregular, etc.) that defines an internal aperture or annulus.

As shown in FIG. 7, compressed air from the compressor enters into an inlet 72 of the inlet header 70. As shown in FIG. 9, this air is received within an interior volume 74 of the header. The compressed air then passes through the core 90, which is formed of a plurality of microtubes, as will be further discussed herein. The compressed air then passes into an interior volume 84 of the outlet header 80 and through an outlet 82 of the outlet header 80. In this regard, the compressed air flows axially between the inlet header 70 and outlet header 80 through the core 90 disposed between these headers.

In conjunction with such flow, exhaust gases enter into exhaust port 86 defined by the annulus of the annular outlet header 80. These exhaust gases pass through a central annulus of the core 90 and exit through an exhaust port 76 (not shown) formed by the annular inlet header 70. In this regard, the exhaust gases flow axially through the recuperator 60. Stated otherwise, the compressed inlet air and exhaust gases counter-flow through the recuperator 60. However, it will be appreciated that in other configurations cross-flow orientations may be utilized. In any case, the exhaust ports 76, 86 formed by the inlet and outlet headers 70, 80 may be incorporated into exhaust gas ducting of the engine.

FIG. 8 illustrates the recuperator 60 having the outlet header 80 and housing removed in order to illustrate the core 90 of the recuperator 60, which carries fluid flow between the interior volume 74 of the inlet header 70 and the interior volume 84 of the outlet header 80. As shown, in the present arrangement, a plurality of microtubes are utilized to carry air flow between the headers 70, 80. These microtubes are better illustrated in FIGS. 10A and 10B. As shown by the partial view of the core 90 in FIG. 10A, thousands of individual microtubes 92 are utilized to fluidly interconnect the inlet header 70 to the outlet header 80. It will be appreciated that the combined cross-sectional area and/or a number of microtubes utilized may be selected based on a maximum mass flow rate of the compressed air stream. That is, the exact number, configuration and sizes of the microtubes 92 may be selected based on individual engine mass flow, pressure drop and heat exchanger effectiveness requirements. However, in any arrangement, the following are noted.

Figure 10A:
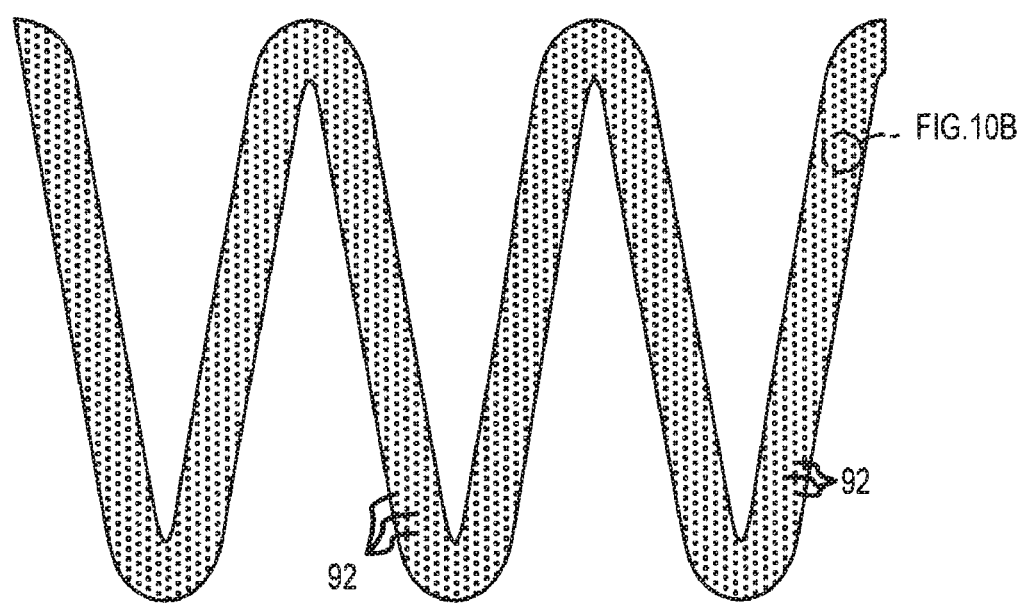
FIG. 10A illustrates a plurality of microtubes.
Figure 10B:
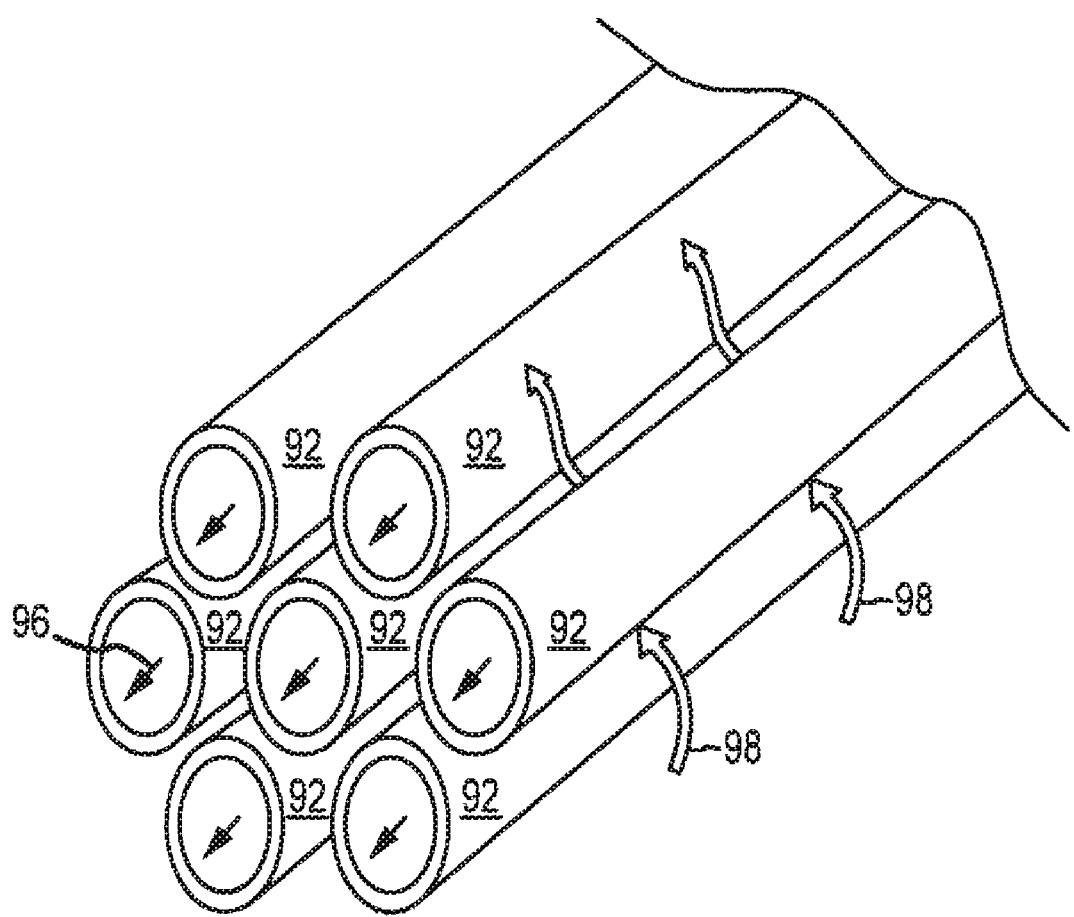
FIG. 10B illustrates a close-up perspective view of microtubes.

FIG. 10B illustrates a close-up perspective view of a subset of the microtubes 92 illustrated in FIG. 10A. As shown, the microtubes 92 are arranged in a parallel orientation as they extend from the inlet header to the outlet header (not shown). Further, each microtube is operative to carry compressed air 96 through its interior surface while exhaust gases 98 may pass over or be directed over the outside surfaces of the microtubes 92. As will be appreciated, allows the heat from the exhaust gases to be transferred to the compressed air within the microtubes 92. It will be appreciated that the amount of heat transferred to compressed air as it passes between the inlet header and the outlet header is a function of a number of variables. For instance, the length, material type and wall thickness of the microtubes will affect heat transfer between the compressed air and exhaust gases. Likewise, the flow (e.g., turbulent flow) of the compressed air flow through the microtubes as well as the flow of the exhaust gases over the microtubes will affect heat transfer there between. In the former regard, flow through the interior of the microtubes is a function of, among other components, the pressure of the compressed air and diameter of the microtubes. In the latter regard, the flow of exhaust gases over the microtubes is a function of, among other components, the spacing between individual microtubes, the orientation of the microtubes relative to the exhaust gas flows, pressure of exhaust gas flows etc. These various components as well as other components may be adjusted based on the requirements of an individual recuperator system.

The microtubes provide a significant increase in surface area in comparison to, for example, a plate-fin arrangement while also providing substantial weight reduction. In this regard, it has been determined that the utilization of microtubes allows for carrying a sufficient mass flow rate and achieving desired thermal transfer between exhaust gases and compressed inlet air to achieve effectiveness ratings that allow for increasing the overall thermal efficiency of an engine without significantly reducing the maximum power of the engine and/or reducing the range/endurance of the aircraft. That is, utilization of microtubes allows for making a light-weight recuperator where the increased weight of an engine incorporating such a recuperator is offset by the increased efficiency such that the overall endurance of such an aircraft may actually be increased.

In order to produce such a light-weight, high-effectiveness recuperator and to provide for the necessary reliability at the elevated temperatures and pressures associated with gas turbine engines, the microtubes are typically formed of stainless steels, nickel alloys and/or titanium alloys. However, use of other materials is possible (e.g., ceramics, molybdenum, etc.) and is considered within the scope of the present invention. In the present arrangement, the microtubes each have an inside diameter that is less than about 2 mm. More preferably, the inside diameters of the microtubes is no more than about 1 mm. In further arrangements, diameters between 0.3-1.0 mm may be utilized. In any case, the wall thickness of such microtubes is typically less than about 0.25 mm (e.g., 250 micrometers). It will be appreciated that by reducing the wall thickness the overall weight of each microtube and, hence, the recuperator weight may be further reduced. Accordingly, it is more preferable to use microtubes having a thickness of between about 50-75 micrometers.

The overall length of each microtube may be selected as a function of the effectiveness, mass flow and pressure drop of the heat exchanger/recuperator. As will be appreciated, the length and inside diameters of each of the individual microtubes will also effect pressure drop across the heat exchanger. In relation to the effectiveness of the heat exchanger, it is noted that the effectiveness of a counter-flow heat exchanger is defined by the differential of the exhaust gases (i.e., Ex) across the recuperator divided by the temperature differential of the compressed air (i.e., CA) across the recuperator. Specifically:

$$\text{Effectiveness} = \frac{(TEx_{in} - TEx_{out})}{(TCA_{out} - TCA_{in})}. \quad \text{Eq. 1}$$

Simply stated, the effectiveness is a fraction of the total temperature difference of the flows into the hot side and cold side of the heat exchanger. When the effectiveness is 1.0, the hot side out temperature of the compressed air would equal the exhaust gas inlet temperature. However, this can never happen as an infinite heat exchange surface would be required. However, while a 1.0 effectiveness is not achievable, use of the microtubes easily allows for achieving 0.6, 0.7, 0.8 or greater effectiveness while maintaining a compact and light weight recuperator. It will be appreciated that by having an effectiveness of over at least 0.6 that engine efficiency may be increased significantly (e.g., 10-100%). That is, less fuel is required to raise the compressed air in the combustor to the necessary temperatures to effectively power the turbine.

It will be noted that pressure drop across the recuperator will result in reduced engine power and such pressure drop can significantly affects shaft output power. However, the use of microtubes allows the recuperator to have an effectiveness of in excess of 0.8 while maintaining a pressure drop of less than about 1.5%. Accordingly, while this affects the total power output of the system, such reduced power output may be within allowable limits. Alternatively, a bypass system may be utilized to bypass the recuperator 60 when maximum power is required (e.g., during take-offs). Such a system is illustrated in FIG. 12, as will be discussed below.

Referring again to FIGS. 8, 9, 10A and 10B, it is noted that the individual microtubes 92 are disposed in an annular array about the peripheries of the annular inlet and outlet headers 70, 80. In this regard, the microtube core 90 defines an annular duct between the inlet port 86 and outlet port 76 of the recuperator 60. In order to better increase the flow over the microtubes 92, the present recuperator 60 utilizes a baffle within the annular duct defined by the microtubes 92 in order to spread the flow of the exhaust gases over the microtubes 92. Specifically, as shown in FIGS. 8 and 9, a displacement cone 102 is affixed to the central annulus defined by the microtubes 92. As shown in FIG. 8, as exhaust gases enter the recuperator, they are deflected outward over the microtubes 92. To further increase heat transfer in the present embodiment, the microtubes are arranged in a serpentine arrangement. This allows for exposing the external surfaces of more microtubes of contact with exhaust gases. However, it will be appreciated that different arrangements of microtubes between the inlet and outlet headers are possible and within the scope of the present invention.

Figure 11A:
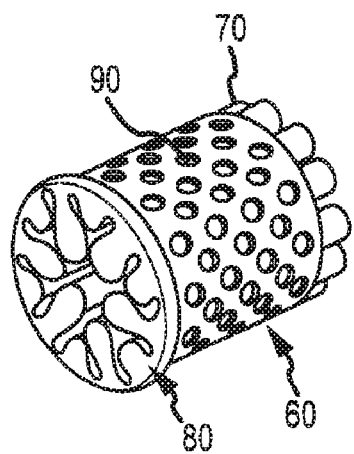
FIGS. 11A-C illustrate a further embodiment of a microtube recuperator.
Figure 11B:
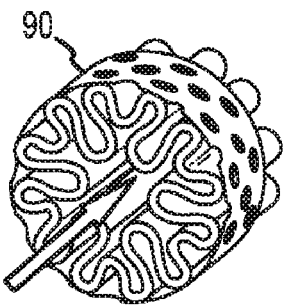
Figure 11C:
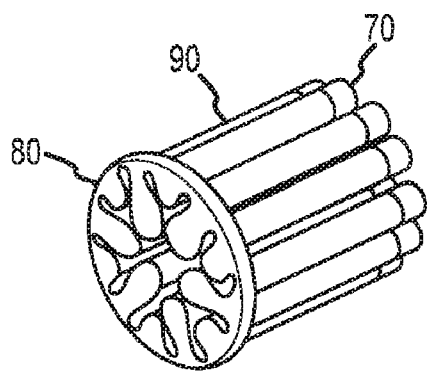
Figure 13:
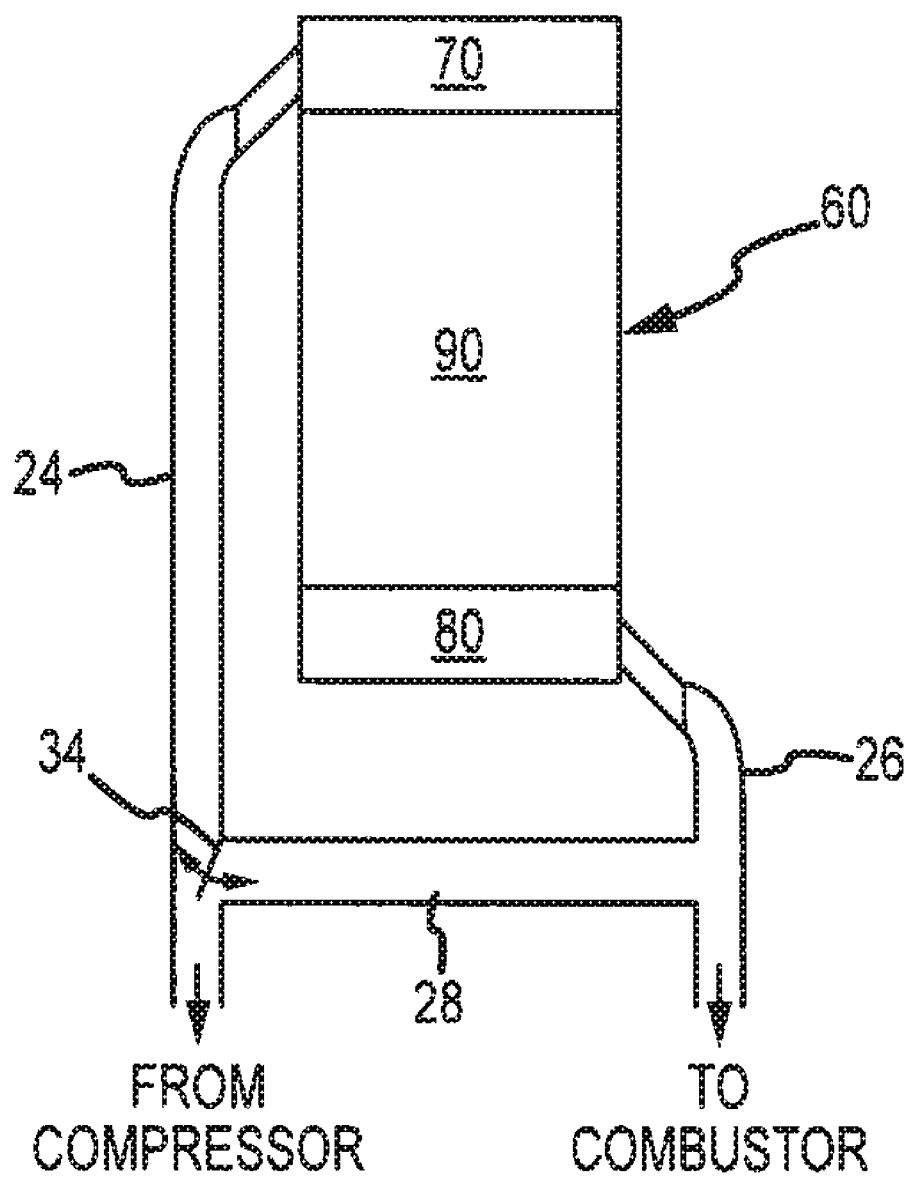
FIG. 13 illustrates use of a bypass manifold with a recuperator.

FIGS. 11A, 11B and 11C illustrate a further embodiment of a recuperator 60 in accordance with aspects of the present invention. As shown, the recuperator 60 again includes an inlet header 70, an outlet header 80 and a core 90 extending there between. Again, the core is made up of a plurality of microtubes disposed in an annular configuration in order to provide an exhaust duct through the recuperator 60. As shown, the microtubes are disposed in a serpentine pattern to allow for improved surface area contact with exhaust gases flowing through the recuperator. In order to further improve the contact with the working gases (e.g., exhaust gases and compressed air gases), the inlet and outlet headers 70, 80 each include an irregular annular shape. In this regard, each of the headers 70, 80 is shaped similarly to the serpentine pattern of the core 90 in order to provide improved exhaust gas fluid flow over the microtubes defining the core 90.

In order to further improve the heat transfer of each microtube, it may be desirable to provide surface imperfections on the interior and/or exterior thereof to provide improved turbulent flow over and/or through the microtube. For instance, the microtubes may be dimpled along their length or utilize a candy-striping process to provide improved turbulent flow over/through the microtubes. In another approach, illustrated in FIGS. 12A and 12B, a coil or metal foil 94 is applied to either an outside and/or inside surface of the microtube 92. In such an arrangement, the coil 94 may be adhered to the inside/outside surface of the microtube 92 in any appropriate manner. In one embodiment, a contact fit arrangement is utilized wherein one of the members (i.e., microtube or coil) is elevated in temperature and/or the other member is reduced in temperature utilizing extreme cold (e.g., cryogenic temperatures) such that one member may be expanded and/or the other member may be contracted. During the existence of this temperature differential, the coil 94 and microtube 92 may be engaged. Upon achieving a common temperature, the coil 94 may be effectively engaged with a surface of the microtube 92. A further and perhaps the most powerful approach to increase heat transfer within the microtubes includes inserting a spirally twisted metal tape into the microtubes. Such tapes may include holes or cut outs to minimize pressure drop while maintaining turbulent mixing of the fluid to improve heat transfer. On the outside of the microtube additional coils, springs or heat transfer strategies may be added.

As noted above, during high power requirement periods, it may be desirable to eliminate the pressure drop across the recuperator 60. Accordingly, as shown in FIG. 11, this is accomplished in the present system by utilizing a bypass duct 28 to allow the compressed air from the compressor to bypass the recuperator 60 during periods of high workload. For purposes of illustration, the exhaust ducting is not shown in this embodiment. As shown, this bypass duct 28 interconnects the compressor outlet duct 24 directly to the combustor inlet duct 26. In this regard, these ducts 24, 28, 28 effectively define a manifold through which the compressed air may be selectively routed between the compressor 20 and the combustor 30. To effectuate such selective routing of the compressed air, the junction between the compressor outlet duct 24 and the bypass duct 28 includes a valve 34. This valve may be selectively positioned to route air through either the recuperator 60 or the bypass duct 28. In one arrangement, the valve 34 is computer controlled. In this regard, a sensor may be associated with the throttle, engine RPM, etc. in order to identify periods of high workload. Upon identifying such high workload periods, the valve 34 may be automatically switched to direct air flow through the bypass port 28. Furthermore, the pilot may manually engage/disengage the recuperator or this could be accomplished via automatic control system.

Power output of the engine may also be reduced by the imposition of an exhaust gas pressure differential across the recuperator. Accordingly, if desired additional ducting may be utilized to bypass exhaust gases around the recuperator during high power situations. Alternatively, the baffle 102 may be formed to expand or contract such that it may be controlled based on the power requirements of the engine. For instance, the cross-sectional deflection area of the baffle may be reduced during high power situations such that exhaust gases may freely flow through the recuperator 60 without being deflected into the microtubes.

What is claimed is
1. A recuperated gas turbine engine system, comprising:
a gas turbine engine having:
an external air compressor outlet duct exiting a compressor of the engine;
an external combustor inlet duct;
an exhaust port exiting the engine; and
a recuperator, including:
an inlet header connected to the external air compressor outlet duct of said engine;
an outlet header connected to the external combustor inlet duct of said engine;
a core formed from a plurality of microtubes each having a first end attached to said inlet header and a second end attached to said outlet header and extending axially between and fluidly connecting said inlet and outlet headers, wherein said plurality of microtubes are disposed in a parallel orientation and define a corrugated wall extending between the inlet and outlet header, wherein said microtubes have an inside diameter of less than 2.0 mm and a sidewall thickness of less than 0.26 mm; and
a housing extending between the headers and surrounding said microtubes, said housing having an exhaust inlet port connected to said exhaust port of said engine and further including an outlet port for connection with exhaust ducting, wherein said housing defines an exhaust duct between said headers.
2. The system of claim 1, wherein said plurality of microtubes comprises at least 1000 microtubes.
3. The system of claim 2, wherein said plurality of microtubes comprises at least ten thousand microtubes.

4. The system of claim 1, wherein each of said plurality of microtubes has a maximum inside diameter of less than about 1.8 mm.

5. The system of claim 1, wherein each of said plurality of microtubes has a maximum wall thickness of less than about 0.1 mm.

6. The system of claim 1, wherein said corrugated wall defined by said plurality of microtubes is disposed in an annular configuration between said inlet header and said outlet header, wherein said exhaust gas inlet port is disposed proximate to said outlet header and said exhaust gas outlet port is disposed proximate to said inlet header.

7. The system of claim 6, wherein said exhaust inlet port and said exhaust outlet port are substantially aligned with a central axis of an annulus defined by said annularly configured corrugated wall, wherein said recuperator is a cross or counter-flow recuperator.

8. The system of claim 7, further comprising:
a baffle element disposed within said annulus, wherein said baffle element deflects axial flow of exhaust gases between said exhaust inlet port and said exhaust outlet port.

9. The system of claim 1, wherein a pressure drop of compressed air between said inlet header and said outlet header is less than about 3%.

10. The system of claim 1, wherein a pressure drop of compressed air between said inlet header and said outlet header is less than about 1.5%.

11. The system of claim 1, wherein inlets of each of said plurality of microtube tips or ends are rounded to improve fluid flow into each said microtube.

12. The system of claim 1, wherein said recuperator has an effectiveness of at least 0.6.

13. A recuperated gas turbine engine system, comprising:
a gas turbine engine of the Rolls Royce Model 250 family of turbine engines, the engine including:
an external air compressor outlet duct exiting a compressor of the engine;
an external combustor inlet duct; and
an exhaust port exiting the engine;
a recuperator, including:
an annular inlet header connected to the external compressor outlet duct of said engine;
an annular outlet header connected to the external combustor inlet duct of said engine;
a core extending between said annular inlet and outlet headers and fluidly connecting said headers, wherein said core includes a plurality of microchannels having a maximum dimension of less than 2 mm in at least one inside cross-dimension wherein said microchannels define a corrugated wall between said annular inlet and outlet headers; and
a housing extending between said annular inlet header and said annular outlet header and surrounding said core, wherein said housing is interconnected to said exhaust port.

14. The system of claim 13, wherein said recuperator is a counter-flow recuperator.

15. The system of claim 13, wherein said recuperator is a cross-flow recuperator.

16. The system of claim 13, wherein said microchannels comprise a plurality of microtubes each having a first end attached to said inlet header and a second end attached to said outlet header, wherein said inside cross-dimension is an inside diameter of said microtubes.

* * * * *